US012608002B2

(12) United States Patent
Guim Bernat et al.

(10) Patent No.: US 12,608,002 B2
(45) Date of Patent: Apr. 21, 2026

(54) COMPUTATIONAL TASK OFFLOADING

(71) Applicant: Intel Corporation, Santa Clara, CA (US)

(72) Inventors: Francesc Guim Bernat, Barcelona (ES); Marcos E. Carranza, Portland, OR (US); Akhilesh Thyagaturu, Tempe, AZ (US); Rony Ferzli, Chandler, AZ (US); Teemu Kaerkkaeinen, Munich (DE)

(73) Assignee: Intel Corporation, Santa Clara, CA (US)

( * ) Notice: Subject to any disclaimer, the term of this patent is extended or adjusted under 35 U.S.C. 154(b) by 788 days.

(21) Appl. No.: 17/847,236

(22) Filed: Jun. 23, 2022

(65) Prior Publication Data
US 2022/0317692 A1     Oct. 6, 2022

(51) Int. Cl.
 G05D 1/00          (2024.01)
 B25J 9/16          (2006.01)
(52) U.S. Cl.
 CPC .......... G05D 1/0217 (2013.01); B25J 9/1661 (2013.01)

(58) Field of Classification Search
 CPC .... G05D 1/0217; G05D 1/0297; B25J 9/1661
 See application file for complete search history.

(56) References Cited

U.S. PATENT DOCUMENTS

| | | | |
|---|---|---|---|
| 2014/0274069 A1* | 9/2014 | Scheim | H04W 28/086 |
| | | | 455/444 |
| 2018/0035284 A1* | 2/2018 | Fujinami | H04W 8/245 |
| 2019/0364492 A1* | 11/2019 | Azizi | H04L 67/12 |
| 2022/0394586 A1* | 12/2022 | Chen | H04W 48/20 |

* cited by examiner

*Primary Examiner* — Benjamin M Thieu
(74) *Attorney, Agent, or Firm* — Viering, Jentschura & Partner mbB

(57)          ABSTRACT

A computation offloading device includes a plurality of communication nodes, each configured to wirelessly send and receive data; a processor, configured to instruct a computation node of a plurality of computation nodes to process a data payload received from a robot at a first communication node of the plurality of communication nodes; select one or more second communication nodes of the plurality of communication nodes, different from the first communication node, based on a predicted location of the robot; and instruct the one or more second communication nodes to send a result of the processed data payload to the robot at the predicted location.

20 Claims, 6 Drawing Sheets

COMPUTATIONAL TASK OFFLOADING

TECHNICAL FIELD

Various aspects of this disclosure relate to computational task offloading, such as optionally in a dynamic environment with low latency.

BACKGROUND

Robots are widely used in a variety of personal and industrial settings and continue to move closer to ubiquity in everyday situations. Robots may perform any of a variety of tasks within their surroundings, such as, for example, transportation of people or objects, assembly, testing of devices, etc., each of which may require processing of large data payloads. In addition, fundamental tasks such as object recognition and navigation typically require processing of large data payloads.

Such processing of large data payloads may demand significant computation resources. It may be undesirable for robots to process these data payloads themselves. For example, many data payloads may require expensive hardware, particularly for rapid processing of the data payloads according to tight latency restrictions. Furthermore, processing of data-heavy payloads may demand significant power resources. Considering that many robots are battery powered, local processing of such tasks may exceed local power budgets. In light of these factors, it may not be commercially desirable or viable to equip the robots with the necessary computation resources to perform certain computational tasks. Instead, it may be desirable for the robots to offload certain computational tasks to an external processor and/or larger infrastructure.

Such computational offloading, however, introduces additional transmission delays, such as delays during which one or more data payloads are sent to the computation offloading manager, handshake delays, delays based on transmission of a processing result to the robot, etc. In some circumstances, the processing of these data payloads may be associated with restrictive latency requirements, and therefore it may be necessary or desirable to manage the computational offloading to reduce latency. Furthermore, some robots are able to change position (e.g. travel or locomote), and they may travel between areas of a given environment during the computational offloading.

In a given environment, certain computation nodes may be acceptable for performing the computational task, whereas other computation nodes may be poorly suited (e.g. when the node lacks sufficient computation resources, or when the node had sufficient computation resources, but they are otherwise unavailable). Thus, it may be necessary to select a suitable node from a plurality of potential computation nodes for processing of a data payload.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which.

DESCRIPTION

Figure 1:
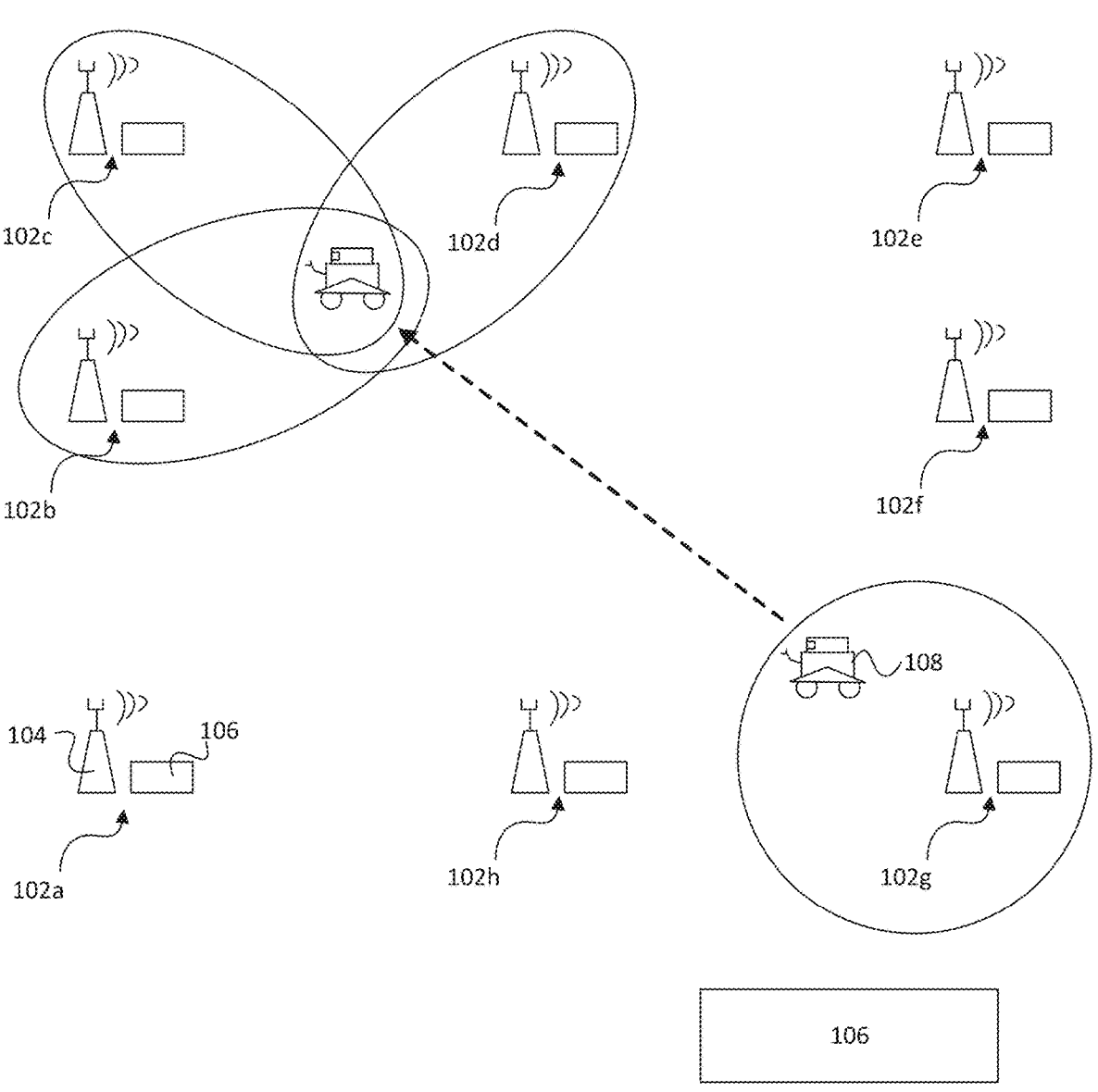
FIG. 1 depicts a robot travelling within an environment.

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements] ") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as radiofrequency (RF) transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

The term "communication node" is used herein to connote any device that creates a wireless connection to a robot, such as for data uplink or downlink. This may include, but is not limited to, a base station, an access point, a radio head, or otherwise.

The term "computation node" (also "computation node") is used herein to connote a device that may perform computations on offloaded data. This may include, but is not limited to, an edge server, a CPU, one or more processors, a cloud server, etc.

It is recognized that the communication node and the computation node may be configured within the same device, for example, a base station. Where these terms are configured in the same device but are referred to separately, this is done merely for convenience, wherein the term communication node is more generally directed to the portion of the underling device that enables wireless communication with the robot, and the term computation node is more generally directed to the portion of the device for processing offloaded data.

The term "computation offloading manager" (also referred to herein as a "task manager") refers to the one or more processors or the computational device that processes an offload request and selects the computation node for task processing. The computation offloading manager may be implemented across more than one physical device, for example, such that the offload request is processed in one device and the selection of a computation node for task processing occurs in another device.

The term "infrastructure" is intended to encompass at least the computation offloading manager, the communication nodes, and the computation nodes. In certain instances, the term infrastructure may be used with particular emphasis on a specific element, such as referring specifically to the computation offloading manager (e.g. "the infrastructure generates a heatmap"), specifically to the computation resource (e.g. "the infrastructure performs the requested computations on the offloaded data set"), or specifically to the communication node (e.g. "the infrastructure sends the result of the computations to the robot").

The term "robot" as used herein may refer to any device that is capable of changing locations and performing an autonomous or semiautonomous function. Throughout this description, the robot may be referred to as an industrial robot, such as a robot for hauling, testing, repairing, etc. The robot may be optionally configured as a vehicle, such as an unmanned autonomous vehicle or a manned autonomous or semi-autonomous vehicle. References to industrial settings are made for convenience and are not intended to exclude a non-industrial setting.

Previous generations of robots performed predefined tasks without feedback from a perception sensor (e.g. without perceiving their environment or taking into account their perception of the environment, so-called "dumb robots"). As robot technology has advanced, robots have become more commonly designed to perform one or more tasks while perceiving their environment or otherwise relying on sensor information for guidance in task performance. Such perception may extend beyond simple feedback loops and instead rely on intelligent systems, such as, for example, any of decision making, perception, navigation, or task management. Such robots may be referred to as intelligent agents or autonomous agents.

In many implementations, it may be undesirable or impossible for a robot to satisfy its own computational requirements. Many tasks to be completed by a robot involve computationally demanding and/or machine/deep learning components that require sophisticated computation resources, necessitate large amounts of memory, and/or consume large amounts of power. In light of this, it may be preferable to offload certain tasks onto an exterior computation resource, such as, for example, an edge server, which may be equipped with more sophisticated computation resources (e.g. larger CPU, more cores, accelerators, etc.), have greater amounts of memory, and may not be battery-constrained. Offloading such tasks, however, often requires the transfer of large quantities of data to the exterior computation resource. For example, a robot may transfer image data (e.g. camera data, LIDAR data, etc.), audio data, sensor data, or any other data sets for further processing and/or analytics. As these data sets may be of significant size, an additional transfer time is added to the processing time.

Tasks to be offloaded are often subject to tight, and frequently inflexible, latency requirements. The underlying procedures may, for example, heavily rely on camera data, Light Detection and Ranging (LIDAR) data, ultrasound sensor data, microphone data, or any of these. It may be necessary for the robot to rapidly process these data, such as for perception or navigation purposes. This may be particularly true regarding analytics and diagnostics related to safety. Many of these required procedures may be computationally expensive and subject to strict latency requirements, which may take the form of service level agreements (SLA), statutory requirements, regulatory requirements, or otherwise. In some circumstances, it may be necessary to process the requisite data payloads, for example, within the microsecond to millisecond range.

Excessive latency in processing safety related analytics may have significant and unacceptable safety consequences for a robot, such as increased probability of collisions. Furthermore, many safety-related procedures may be subject to stringent regulatory standards and thus must not exceed a predefined latency budget.

One strategy for reducing latency in the context of data offloading is to reduce the distance that data must be transmitted. For example, a robot transferring a data payload to a closest communication node (e.g. closest access, closest base station) and/or selecting a close/closest communication node for transferring the results of the processed payload to the robot may reduce latency. A key consideration is that robots may move (e.g. change positions, locomote) within their environment, even during a data offloading procedure. Such a change in location may result in the ideal communications node for the upload of offloaded data to the computation resource (e.g. edge server) to no longer be the ideal communications node for the download of the result of the offloaded task to the robot.

Moreover, latency can further be reduced by selecting a suitable computation node (e.g. a server, a processor) for processing the offloaded data payload. Often multiple computation nodes may be available for processing; however, they will often possess heterogeneous computation resources (e.g. some will be faster, some will be better suited for certain tasks, some will have greater available bandwidth). Selecting a preferred computation node for offloading may also reduce latency.

Herein are described various strategies to reduce latency by selecting a communication node for downloading results of a processed data payload at a preferred location for a mobile robot. Furthermore, procedures are disclosed herein for the infrastructure (e.g. switches, computation resources) to make decisions on migration/location of computation resource factoring in dynamic vehicle movement and to select preferred computation nodes in light of current and predicted future conditions.

According to an aspect of the disclosure, the principles, methods, and devices disclosed herein may permit improved task-offloading for robots by working with the infrastructure to create resource data of current and future network resources, create load balancing mechanisms, and create future reservations. In this manner, robots can optionally request the infrastructure to provide current and/or predicted resource data of the network in terms of locations of communication nodes (e.g. an absolute location of a base station, a location relative to the robot, a location relative to other base stations) and available computation resources (e.g. latency of a node, available computation resources on a node, available bandwidth, available hardware, etc.). Robots can request the infrastructure to provide a set of communication nodes (e.g., access points, base stations, macro-antennas) and computation nodes that can satisfy certain computational and network Service Level Objectives (SLO) (e.g. latency requirements) at the present or at a future time. The robots may require the infrastructure to reserve network and computation resources for a particular point of time after receiving a proposal from the infrastructure. The above resource data may relate locations of each of a plurality of computation nodes to an availability of a computation resource or the availability of a network resource at each respective computation node of the plurality of computation nodes. The resource data may optionally be presented as a map or a heatmap.

According to an aspect of the disclosure, the infrastructure may generate and update (e.g. periodically update, occasionally update) resource data, such as updating a map of the locations of the communication nodes and computation resources, as described above. These may take a variety of forms. It is generally understood that the resource data depicted as a "map" includes a representation of a location of the communication nodes and a status of availability of one or more computation resources or network resources at the corresponding location. This may be optionally depicted in the form of a map, generally, or in a heatmap more specifically. In the context of a heatmap, colors of the communication nodes and/or computation nodes may be depicted in relative space, and one or more colors and/or textures may be used to indicate status or availability of computation resources and/or network resources. The map or heatmap as disclosed herein, however, represents only a small sample of the manner in which these data can be depicted. Other possibilities include, but are not limited to, numerical data sets, and computational values with identifiers based on known locations of the communication nodes and/or computation resources, topography maps, or otherwise.

The infrastructure may generate the resource data (e.g. map, heatmap) using current statistics or analytics (e.g. such as from the various computation nodes). The infrastructure may generate the resource data as a prediction of future computation availability using past and/or current data or analytics. The infrastructure may optionally utilize machine learning (e.g. long short-term memory) to project future resource data (e.g. heatmaps) based on current and previous heatmaps and future reservations. In this manner, current heatmaps may be based on the current network and/or computational telemetry; future heatmaps may be based on a future allocation mechanism or reservations and/or based on current computational capacity and potentially using prediction mechanisms.

FIG. 1 depicts a robot travelling within an environment. The environment includes various infrastructure elements 102a-102g, any or all of which may include a communication node 104 and/or a computation node 106. The communication node may include a baseband modem, which may be configured to modulate data for transmission as one or more electromagnetic signals and/or to demodulated received electromagnetic signals into its respective data bits. The transceiver may be configured to amplify and send a signal (e.g. an analog electrical signal) as an electromagnetic signal over one or more antennas. The transceiver may be configured to receive an electromagnetic signal (e.g. over one or more antennas) and convert the signal into an amplified analog signal.

The environment may include a computation offloading manager 106, which may be configured as an edge server, one or more processors, CPU, or any other processing entity capable of performing the tasks of the computational task server as described herein.

The environment may include one or more robots 108. The robots may be optionally configured as vehicles and/or may be configured to autonomously or semi-autonomously change locations (e.g. locomote). The robots may be optionally equipped with one or more wheels, one or more tracks (e.g. similar to a tank), one or more legs, or any other device which may permit the robots to change location. In some implementations, the robots may be configured to fly, such as in the case of an unmanned aerial vehicle.

In FIG. 1, the robot 108 is depicted as being within a first wireless transmission region around infrastructure element (communication node) 102g. The robot 108 may send an offload request, which may include a task type to be performed on a data payload, a timing requirement for completion of the task, and the corresponding data payload. Although the term "offload request" is used herein in the singular, the offload request may include a plurality of messages, data packets, or transmissions, for example, such that the timing requirement is sent in one message and the data payload is send in another message.

The robot 108 may be configured to send the offload request to a closest communication node 102g of the plurality of communication nodes (see generally, 102a through 102g). Each of the communication nodes may be communicatively linked to the computation offloading manager 106, such as by being able to send and receive data packets according to any internet protocol, or via any other suitable method for transmitting data. Communication node 102g may transfer the offload request (or data corresponding to the offload request) to the computation offloading manager 106.

The computation offloading manager 106 may select a computation node of the plurality of computation nodes (106 separately, or as part of any of 102a-102g) based on the task type, the timing requirement, and available computation resources of the plurality of computation nodes. The computation offloading manager 106 may instruct the selected computation node to perform the task; select a communication node of the plurality of communication nodes (104 separately, or as part of any of 102a-102g) based on a predicted location of the robot at a completion of a duration corresponding to the timing requirement; and instruct the selected communication node to send a result of the task to the robot.

As depicted in FIG. 1, the robot 108 may change locations, such as between sending the offload request and receiving the results of the processed computational task (see dashed line, indicating movement of the robot during this period). In this manner, the communication node 104 selected by the computation offloading manager 106 may optionally be different from the communication node 104 that to which the robot 108 uploaded its data for offload-processing.

The computation offloading manager 106 may select one or more second communication nodes for sending the results of the processed task to the robot 108 based on a predicted location of the robot. This prediction may be based on information provided by the robot 108 (e.g. an intended destination, a heading, a velocity, an acceleration, a current task associated with a particular movement or destination, etc.); information determined by or known to the computation offloading manager 106 (e.g. based on an angle of arrival of a signal from the robot, based on a current or future task assigned to the robot, etc.); or based on a prediction from historical data. If the computation offloading manager 106 selects multiple communication nodes for sending the results of the processed task, the computation offloading manager 106 may elect to have the selected communication nodes multicast the results. In this manner, the robot 108 can receive the results from its closest communication node.

The robot 108 may include a processor, which may be configured to perform any of the computational tasks disclosed herein in relation to the robot. The robot may include one or more transceivers, configured to wirelessly send and receive electromagnetic signals. The robot may include one or more actuators, which may be configured to permit the robot to change from a first location to a second location. The robot may further include an interface to the one or more transceivers, configured to carry electric signals from the processor to the one or more transceivers, and from the one or more transceivers to the processor.

Returning to FIG. 1, the computation offloading system may include a plurality of communication nodes (104 corresponding to each of 102a through 102g), each configured to wirelessly send and receive data; a robot 108, configured to send an offload request and a data payload to a first communication node 104 corresponding to 102g) of the plurality of communication nodes; a plurality of computation nodes (106 corresponding to each of 102a through 102g), configured to execute computational tasks; a computation offloading manager 106, configured to instruct a computation node 106 of the plurality of computation nodes to process the data payload; select one or more second communication nodes (104 corresponding to 102b thorough 102d) of the plurality of communication nodes, different from the first communication node, based on a predicted location of the robot; and instruct the one or more second communication nodes to send a result of the processed data payload to the robot at the predicted location.

The offload request may include a timing requirement for processing the data payload; such that instructing the computation node of the plurality of computation nodes to process the data payload includes selecting the computation node based on the timing requirement and instructing the computation node to process the data payload. The offload request may include a timing requirement for processing the data payload, and instructing the computation node of the plurality of computation nodes to process the data payload may include selecting the computation node based on timing requirement and instructing the computation node to process the data payload during a duration corresponding to the timing requirement.

The offload request may further include a task type, representing a type of task to be performed on the data payload. Instructing the computation node of the plurality of computation nodes to process the data payload may include selecting the computation node based on a capability of the computation node to process the task type and instructing the computation node to process the data payload.

The robot may be further configured to predict a location of the robot at the completion of a duration corresponding to the timing requirement; wherein the offload request further includes the predicted location of the robot; and wherein the computation offloading manager is configured to select the one or more second communication nodes based on the predicted location. The computation offloading manager may be further configured to select two or more communication nodes based on the predicted location and to instruct the two or more second communication nodes to send the result of the processed data payload to the robot. The computation offloading manager may be configured to predict a location of the robot at the completion of a duration corresponding to the timing requirement; and the computation offloading manager may be configured to select the one or more second communication nodes based on the predicted location. The computation offloading manager may be configured to select two or more communication nodes based on the predicted location and to instruct the two or more second communication nodes to send the result of the processed data payload to the robot. The computation offloading manager may include an artificial neural network, configured to predict the location of the robot at the completion of the duration corresponding to the timing requirement; wherein the computation offloading manager predicting the location of the robot includes predicting the location as an output of the artificial neural network. The computation offloading manager may be further configured to select the computation node of the plurality of computation nodes based on the predicted location. The computation offloading manager may be configured to select the computation node by selecting a closest computation node to the predicted location of the robot. The computation offloading manager may be configured to generate resource data relating locations of each of the plurality of computation nodes to an availability of a computation resource or the availability of a network resource at each respective computation node of the plurality of computation nodes.

Figure 2:
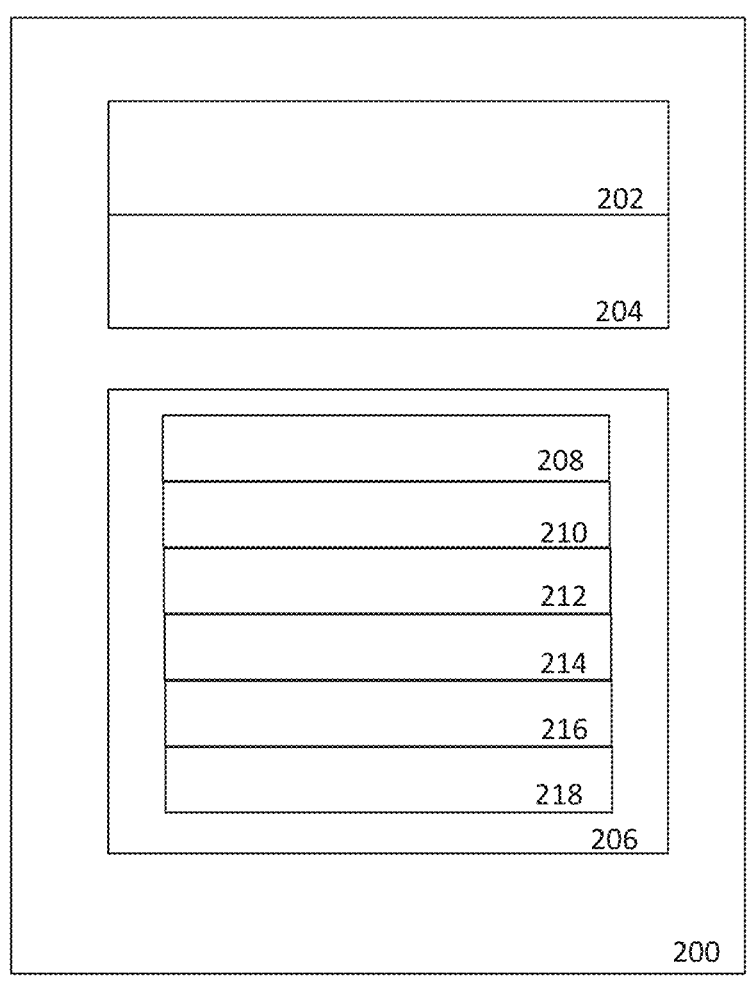
FIG. 2 depicts elements of the robot architecture.

FIG. 2 depicts elements of the robot architecture 200, according to an aspect of the disclosure. The robot may generally be configured with a robot services module 202, which may include any of the services (e.g. functions) that the robot is to perform (e.g., transporting, repair, testing, etc.). The robot may generally include a robot platform module 204, which may be configured to operate any of the basic robot function, such as power management, navigation, locomotion, or the like.

To perform the task offloading as described herein, the robot may be configured with one or more additional logic elements or modules, generally described as the "Infrastructure Drop Logic" 206. The Infrastructure Drop Logic may be implemented in hardware and/or software as desired for the implementation.

The Infrastructure Drop Logic may include a Local Data Set Prediction Logic 208, which may be configured to predict a current or future version of the resource data (e.g. map, heatmap) as described above. In many configurations, the individual robot will not have real time access to analytics regarding the available computation resources of the various computation nodes; however, the computation offloading manager will periodically update and distribute the resource data to the robots. In some circumstances, it may be advantageous for the robot to predict the computational availability and/or network availability of the communication nodes/computation nodes based at least on a most recent resource data. That is, the computation offloading manager will send resource data to the robot; after some time passes, the robot may update the resource data by estimating current computation resources for the various computation node, or it may predict future computation resources for the various computation nodes. The Local Data Set Prediction Logic 208 may be configured to predict the computation resources for the various computation nodes based on one or more previous sets of resource data, analytical data, telemetric data, or any combination thereof The robot may include an Interface Logic 210, which may be configured to permit the software stack on the robot to interact with aspects of the task offloading described herein. For example, the Interface Logic 210 may permit the software stack to discover future or current sets of resource data (e.g. maps, heatmaps) of the infrastructure, which may include network data and/or computational availably data. The Interface Logic may permit the software stack to require the computation offloading manager to allocate current or future resources for the robot, such as those submitted to a particular node and/or executed in a particular node. The Interface Logic 210 may be configured to communicate to the computational offload manage (e.g. via a communication node) a particular service level objective. The robot may communicate a particular communication node (or a location closely corresponding to a communication node) for pickup of the offloading result. That is, applications (e.g. the software stack) can utilize the Interface Logic 210 to submit a new request for a task, which may include the task to be executed, one or more payloads, Service Level Agreements indicating when the result has to be ready, when the task needs to be executed and where the payload will be dropped; potential locations where the result for the execution needs to be gathered; or any of these.

The Interface Logic 210 may be configured to gather results for a particular offload task. Once the robot sends an offload request, the infrastructure may provide the robot with a task ID. Using this task ID, an application may check, via the Interface Logic 210, whether the results have been received from the infrastructure. In instances in which the application does not provide list of potential locations where the robot may collect the result of an offloaded task, the Interface Logic 210 may estimate potential locations for pick up based on any of the service level agreement (e.g. a maximum allowable/tolerable latency) for computing the task; current direction of travel (e.g. heading, velocity, acceleration, route) and a prediction (e.g. based on the foregoing) of where the vehicle will be upon completion of the predicted delivery time (e.g. the service level agreement time, the maximum latency, etc.); current programmed route if available.

For the Interface Logic 210 to perform the above functions, the robot must maintain a list of tasks whose results are pending (e.g. still need to be obtained) and, to the extent possible, at which specific locations. Once the robot is connected to the infrastructure elements (e.g. communication node) close to those locations, the robot will attempt to retrieve the results. Once the results are obtained, the tracking for that task may be discontinued.

To that end, the robot may include a reservation table 212 that may be used to track pending requests that need to be executed or scheduled by the logic in the future. Each pending request may include the task to be executed (e.g. by identifier, by name, by type) and an access point/retrieve point (e.g. by location, by communication node).

The reservation table 212 may also include additional fields that can be used by the scheduling logic (placed within the infrastructure negotiation logic, infra), such as task priority, amount of data to be sent, service level objective for network and computation resources, or any of these.

The robot may include an infrastructure negotiation logic 214, which may interact with the infrastructure, such as to perform a handshake for the various actions that have been described above. This logic may further include any of authentication with respect to the infrastructure, telemetry, or billing.

The robot may include known resource data storage 216 for one or more previously receives sets of resource data (e.g. maps, heatmaps) related to computational or network resources. The local dataset prediction logic 208 may be configured to assess the known resource data storage 216 to receive information of one or more previous sets of resource data.

The robot may include a pending request table 218, which may include a list of offload requests from the robot's various applications. Once an offload request is transmitted to the infrastructure and accepted, the request may be moved from the pending request table 218 to the reservation table 212. Exemplary entries in the pending request table may be as follows:

| Service ID | Future Time Stamp | Service Level Objective |
|---|---|---|
| ID 0X36 | TIME 540334343 | Network & Compute SLOs 1 GBS/2 C + 3 GB | wherein the request has an identifier, a time stamp (e.g. a time to connect to the infrastructure, at time for completion, etc.), and a service level objective.

An exemplary reservation table 212 may be as follows:

| Service ID | Access Point & Compute | Service Level Objective | Future Time Stamp |
|---|---|---|---|
| ID 0X32 | ID, ID 0X34, 0X43 | Network & Compute SLOs 1 GBS/2 C + 3 GB | Time 340334343 |
| . . . | . . . | . . . | . . . |

Any of the above aspects of the robot as discussed in connection with FIG. 2 may be placed in any of a plurality of areas of the robot architecture, which may include the platform, network interface controller, central processing unit, or discrete accelerator.

Turning to the interaction between the robot and the infrastructure, and as a general matter, the robot may request (or require) the infrastructure to compute a given task, with a given payload, within a particular time. The robot may optionally provide suggestions for a location at which the robot will retrieve/receive the results.

Throughout this disclosure, both robot-generated estimations of robot location (e.g. location for a result pickup) and infrastructure-generated estimations of robot location are discussed. The particular implementation may rely entirely on robot-generated estimations, may rely entirely on infrastructure-generated estimations, or may utilize a hybrid schema, in which both robot-generated estimations and infrastructure-generated estimations are used. In the robot-generated estimation approach, the location estimation for the results is based on the knowledge of the robot. This places the burden on the infrastructure (e.g. the edge/cloud application) to determine the location of a corresponding computation node and/or communication node, and thus a location of result delivery. In the infrastructure-generated approach, the robot is not required to have any knowledge or expectation of the future locations. In the hybrid approach, the location expectation from the robot may be combined with the infrastructure's knowledge, for e.g., based on handovers, and user tracking, to determine where the robot will be at the end of the latency period. The infrastructure may then forward this information to the edge/cloud apps to be able to identify the result delivery at a specific location.

Figure 3:
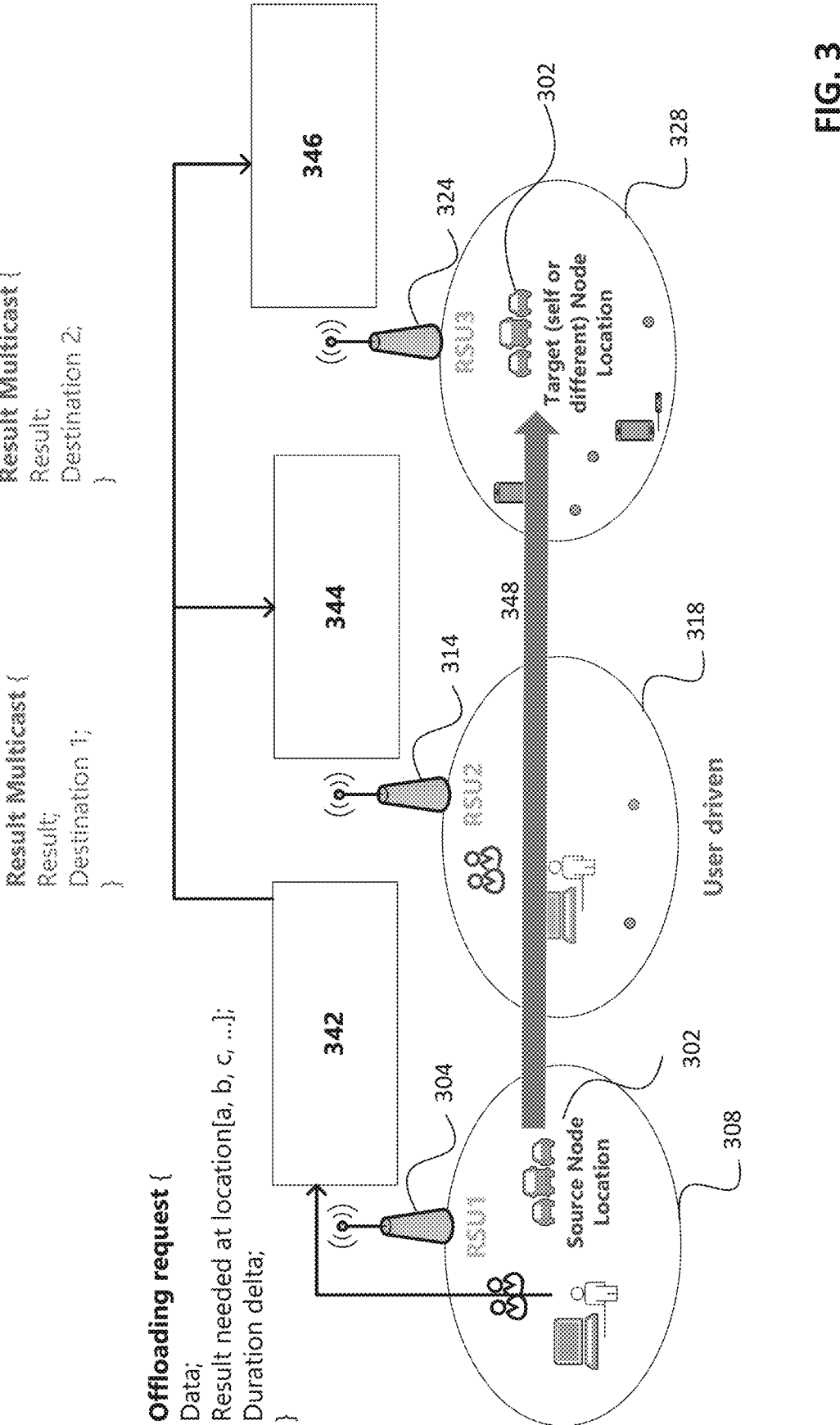
FIG. 3 depicts a robot-driven approach for determining a pickup destination.

FIG. 3 depicts a robot-driven approach for determining a pickup destination, according to an aspect of the disclosure. As shown in the FIG. 3, the robot 302 may send an offload request to a communication node 304, associated with a communication zone 308. Note that the communication node 304 may have its own processor, which could be capable of performing the offloading task (in which case it would be considered as a joint communication node and computation node), or it could be simply a node (e.g. a radio head), connected to one or more processors located elsewhere. In this example, the communication node 304 and the corresponding communication zone 308 are associated with processor 342. The offload request in this case includes the data (e.g. the payload) to be processed, locations for pickup ("result needed at location"), and a time for pickup ("duration delta"). The robot 302 selects the locations for pickup based on a planned path of travel 348. The computation offloading manager selects a computation node (in this case 342) for processing. This may be selected, for example, because computation node 342 has the best-suited available resources for the request. Computation node 342 processes the request, and the computation node 342 and/or the computation offloading manager instructs the network to multicast the results from 314 (corresponding to computer 344) and 324 (corresponding to compute 346), which the robot identified as sites for pickup.

Figure 4:
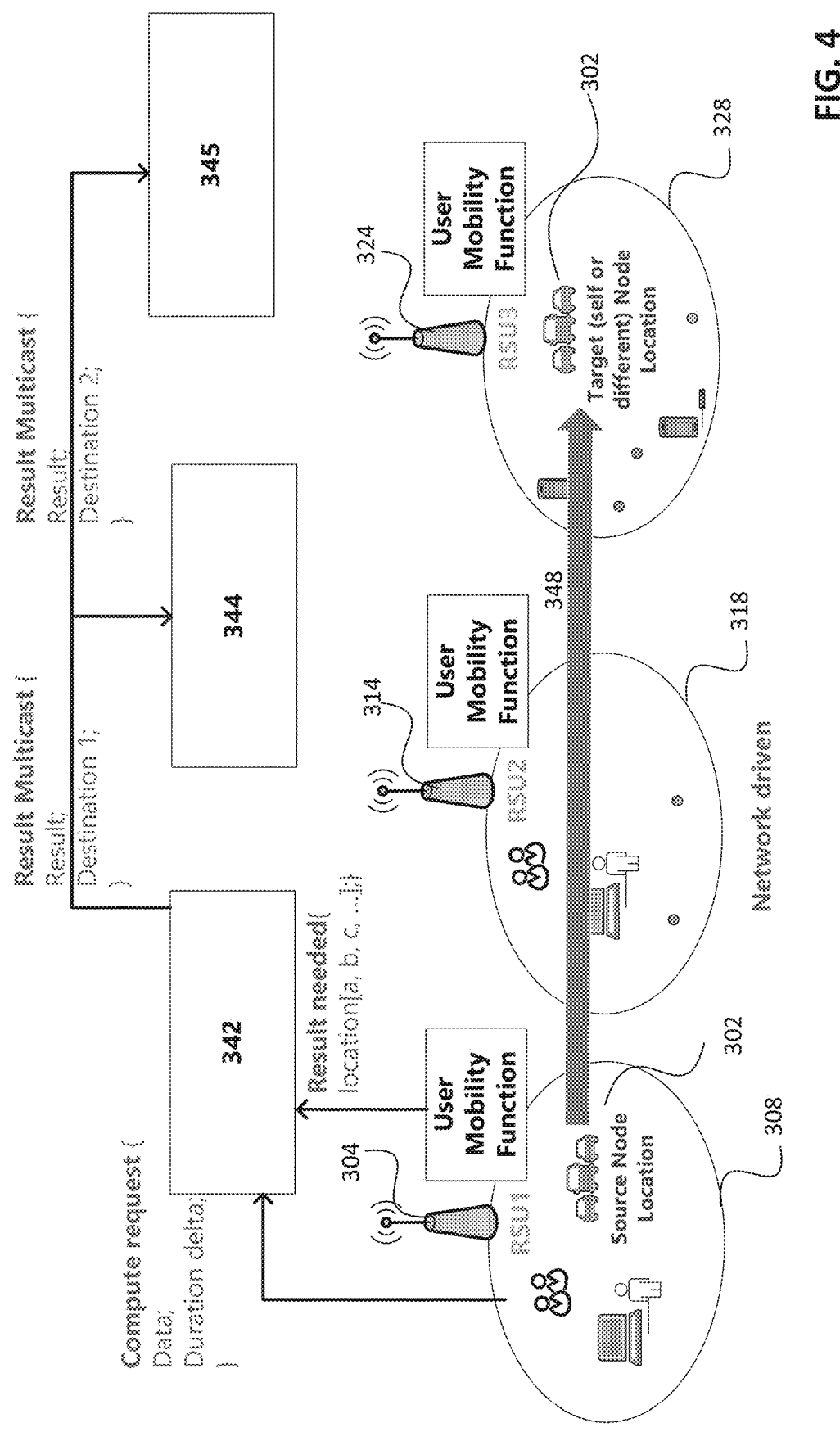
FIG. 4 depicts a network-driven approach for determining a pickup destination.

FIG. 4 depicts a network-driven approach for determining a pickup destination, according to an aspect of the disclosure. As shown in the FIG. 4, the robot 302 may send an offload request to a communication node 304, associated with a communication zone 308. As with the last example, the communication node 304 and the corresponding communication zone 308 are associated with processor 342. The offload request in this case includes the data (e.g. the payload) to be processed, and a time for pickup ("duration delta"). The infrastructure includes one or more "user mobility functions", which may be any function capable of estimating and/or determining any of a robot's heading, velocity, acceleration, position, path of travel, or destination (see "user mobility function"). The computation offloading manager selects a computation node (in this case 342) for processing. This may be selected, for example, because computation node 342 has the best-suited available resources for the request. As the robot 302 travels, (e.g. such as through the various nodes), the robot passes through zones 308, 318, and 328. In each of these zones, the infrastructure may perform one or more user mobility functions to determine a heading, velocity, acceleration, position, path of travel, or destination of the robot 302. Based on the user mobility function, the infrastructure selects one or more locations for a multicast of the results. In this case, the infrastructure selected 344 and 345 for multicasting based on the user mobility function.

The task offloading as described herein may alternatively be implemented in a hybrid system, which is a combination of the robot-driven system above and the network-driven system above. In this system, the robot may provide one or more suggested locations for pickup, as in the robot-driven system. Moreover, the network may perform one or more user mobility functions as in the network-driven system, through which one or more of the robot's suggestions for a pickup location may be deleted and/or one or more additional areas for a pickup location may be added.

Once the computation node has completed the computations and reached the corresponding results, the computation node may generate a multicast with the result to any pickup locations provided by the infrastructure. The pickup locations may include each location provided by the robot. Alternatively, the infrastructure may add or remove pickup locations from the list provided by the robot, such as based on any determinations that it makes regarding the location of the robot at the delivery of the results.

Once a result has been delivered, the communication node where the robot collects the results may generate a multicast to other peers (e.g. to other communication nodes, to other computation nodes) that the robot has received the results. Depending on the configuration, a computation node corresponding to the communication node from which the robot receives the result may send this message. Alternatively or additionally, the computation offloading manager may send this message.

In deciding to which computation nodes/communications nodes should receive the results of the offload request, the infrastructure may consider any of the current SLA (e.g. latency) status for the task (e.g. whether task completion occurred according to schedule, or whether it took longer than expected), available time for the task, a prediction of where the robot will be for pickup, a reliability of the computation node/communication node where the robot pick up the results (e.g. if a computation node has no available resources and cannot accept the results and/or transfer the results to the robot), etc.

Where the latency budget is short, the infrastructure may send the task to multiple computation resources for parallel or concurrent processing. In this manner, the infrastructure can send the first-received results for pickup.

In an alternative configuration, any of the tasks disclosed herein as pertaining to the computation offloading manager may be performed by any of the computation nodes.

Figure 5:
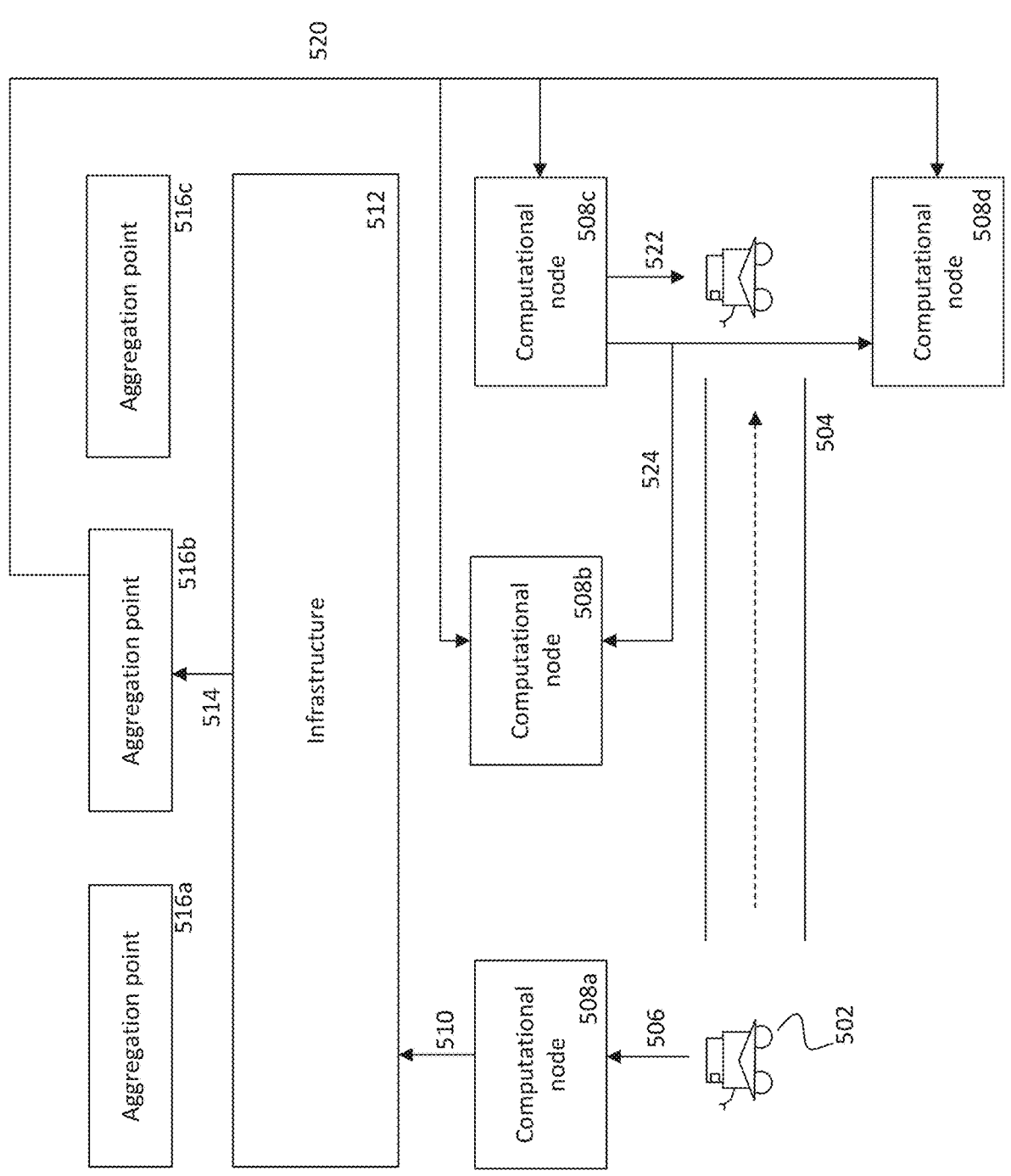
FIG. 5 depicts an exemplary offloading workflow.

FIG. 5 depicts an exemplary offloading workflow, according to an aspect of the disclosure. The robot 502 travels along a physical area (e.g. a lane, a manufacturing or shop floor, a road, etc.) from a first position (robot 502 on left) to a second position (robot on right). The robot 502 sends a computation node 508a of a plurality of computation nodes 508a, 508b, 508c, 508d (note, the request may be sent to a communication node, not depicted, which may be associated with any one of the computations nodes and/or a central infrastructure authority, such as the computation offloading manager), an offload request 506, which may include a function, a payload, a latency requirement, and one or more optional pickup points (e.g. "AMR 2X (Function, Payload, SLA, ProjectionPickUpPoints")). The computation node 508a may send the infrastructure 512 (e.g. the computation offloading manager) the offload request, optionally appended with any of a request ID and a robot ID 510 (e.g., "AMR 2X (Function, Payload, SLA, ProjectionPickUp-Points, UEID")). The infrastructure 512 may select a computation node (e.g. an edge server) to perform the computation and forwarding 514 (e.g. "Edge selection & compute forwarding") and may send this directly to the relevant computation node(s) or to an optional aggregation point 516b of a plurality of aggregation points 516a, 516b, 516c, which then computes the function (e.g. on the payload) within the allowed latency period (e.g. the SLA). The relevant computation node(s) or the optional aggregation point 516b send a speculative multicast result 520 to a plurality of computation nodes 508b, 508c, 508d and/or corresponding communication nodes. The robot 502 picks up the result at a computation node or communication node 522, and the computation node or communication node from which the result is picked up sends a notification 524 to the other nodes that received the speculative multicast 520 that the results of the offloaded payload processing have been picked up 524.

At least as depicted herein, the infrastructure may interface with the robots to receive offload requests (506 510), send identification numbers for submitted offload requests (510, 514), and receive data payloads from the robot. According to one aspect, the robots may have a unique ID (e.g. a unique universal ID (UUID)), which the infrastructure may use to map requests to the requesting robots. According to another aspect, each request may have a unique ID (e.g. such as a UUID). For a given request, the infrastructure may be configured to determine whether the infrastructure has provided a corresponding response to the robot. If not, and upon completion of the data payload processing, the infrastructure (e.g. the communication node, the computation node, or the computation offload manager) may authenticate the robot and provide the authenticated robot with the processing results. The infrastructure may further be configured to send a notification to the other entities of the infrastructure that the robot has received the response. Similarly, the infrastructure may send a multicast to corresponding communication nodes and/or computation nodes to drop the results (e.g. delete the results, make the results complete, etc.).

Figure 6:
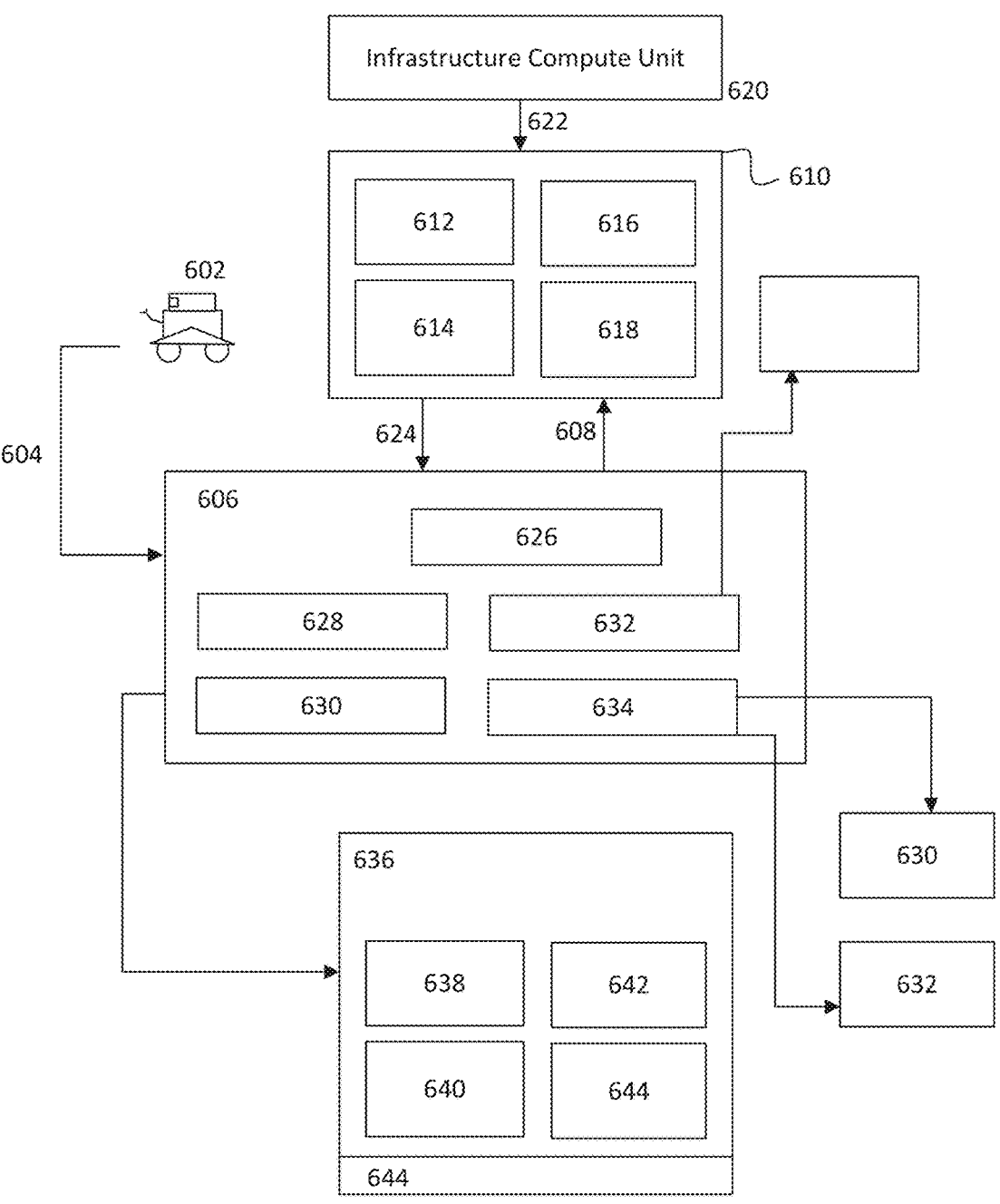
FIG. 6 depicts various functions of the infrastructure.

FIG. 6 depicts various functions of the infrastructure according to an aspect of the disclosure. The robot 602 may be configured to send an offload request 604 to the infrastructure 606. The infrastructure 606 may be configured to send the offload request (optionally, appended with a unique identifier) 608 to an Intelligence Processing Unit 610.

The Intelligence Processing Unit 610 may include a service telemetry unit 612, which may be configured to gather and/or receive from other processors telemetry data about one or more services in the infrastructure. The Intelligence Processing Unit 610 may include an inferred telemetry unit 614, which may be configured to predict future telemetry data for resource data (e.g. a map, a heatmap), such as based on prior telemetry data. The inferred telemetry unit 614 may include information about the network and how the different computation nodes are connected, bandwidth or latency between computation nodes or between a computation node and the computation offloading manager. According to an aspect of the disclosure, this information may be stored in a topological map. This information may be used to schedule requests coming from the infrastructure computation nodes and/or well to generate the multicast.

The Intelligence Processing Unit 610 may further include a multicast logic 616, which may be configured to select one or more second communication nodes and/or computation nodes for sending the results of the offloaded task to the robot. The Intelligence Processing Unit 610 may further include an interface module 618, which may be configured to interface with any one or more elements of the infrastructure (e.g. such as interfacing between the computation offloading manager and any of one or more second communication nodes, a plurality of computation nodes, and one or more robots.

The infrastructure compute unit 620 may be configured to gather information about various services within the infrastructure (such as in the computation nodes) and to send this information to an Intelligence Processing Unit 610. In this case, the infrastructure compute unit 620 has obtained telemetry information about service 1, which it is sending 622 to the Intelligence Processing Unit 610.

The Intelligence Processing Unit 610 may send a message 624 to an infrastructure support unit 608, which may include any of the results of any service registry and discovery for a given service related to the offload request, service telemetry related to that service, and any function execution that may be required. The telemetry information may be information on how the different infrastructure computational units accessible by the infrastructure are behaving. This monitor-data can include, for example, any of computation resource utilization, network utilization, status of a particular service (e.g., road segmentation).

The infrastructure support unit 606, may include one or more interfaces 626, which may be configured as described above to interface with the robots and/or the communication nodes/computation nodes. The infrastructure support unit 606 may further include a brokering logic 628, which may handshake and/or negotiate with any of the computational units for performance of the offloaded task. The infrastructure support unit 606 may further include a monitoring logic 630, which may be configured to monitor the progression of an offloaded task, monitor pickup, etc. The infrastructure support unit 606 may further include various computation nodes (e.g. edge units) 632, which may be configured to perform the offloaded task upon instruction from the infrastructure support unit 606. The infrastructure support unit 606 may further include a service topology mapping logic 634, which may be configured to map available services to their computation nodes and their corresponding physical locations. For example, the service topology mapping logic 634 may maintain a look up table 630, which references an identifier of a communication node/computation node (e.g. an access point, a base station, etc.), a physical or geographical location of the node, and an IP address for the node. The service topology mapping logic 634 may further be configured to maintain a lookup table 632 indicating an identifier of a multicast source, an identifier of a multicast target, and a latency requirement.

The infrastructure support unit 606 may be configured to send the plurality of computation nodes 636 instructions for a computational task. The computation node 636 may include a pick up logic 638, which may be configured to accept or reject incoming requests for offload processing. The computation node 636 may include a results storage module 640, which may be configured to store results of a processed, offloaded task (e.g. results of a function on a data payload). The computation node 636 may include a multicast logic 642, which may be configured to receive a multicast for sending to the robot and send the multicast upon authentication of the robot as a recipient. The computation node 636 may include one or more interfaces 644, for interfacing with the infrastructure support unit 606 and/or the robot.

The brokering logic may be responsible for brokering the requests that come from the robot. Thus, the brokering logic may select one infrastructure computation node of the various potential infrastructure computation nodes that is a better match for the request and the provided SLA. Multiple factors can be used, such as status of the various edges; and/or computational requirements for the request. This can either come with the request itself or can be known if the task is provided by the system. It may be configured to calculate distances between the edges and the infrastructure computational unit that may pick up the result, submit the task to the selected computation node; and once the computation node generates the result, the infrastructure may validate that the current places where to multicast the result (e.g. selected based on application initial feedback) are still acceptable. This may be performed based on current location of the robot, time to travel for the request results to the various infrastructure computational unit candidates; estimated locations where the robot has the greatest chances of going. For this, the unit may optionally consider the load of the network to each infrastructure computational unit candidates and/or other aspects such as reliability of the network and robots.

Additional aspects of the disclosure will be described by way of example:

In Example 1, a computation offloading device including a plurality of communication nodes, each configured to wirelessly send and receive data; a processor, configured to instruct a computation node of a plurality of computation nodes to process a data payload received from a robot at a first communication node of the plurality of communication nodes; select one or more second communication nodes of the plurality of communication nodes, different from the first communication node, based on a predicted location of the robot; and instruct the one or more second communication nodes to send a result of the processed data payload to the robot at the predicted location.

In Example 2, the computation offloading device of Example 1, wherein the offload request includes a timing requirement for processing the data payload; and wherein the processor instructing the computation node of the plurality of computation nodes to process the data payload includes the processor selecting the computation node based on the timing requirement and instructing the computation node to process the data payload.

In Example 3, the computation offloading device of Example 1, wherein the offload request includes a timing requirement for processing the data payload; and wherein the processor instructing the computation node of the plurality of computation nodes to process the data payload includes the processor selecting the computation node based on the timing requirement and instructing the computation node to process the data payload during a duration corresponding to the timing requirement.

In Example 4, the computation offloading device of any one of Examples 1 to 3, wherein the offload request further includes a task type, representing a type of task to be performed on the data payload, and wherein instructing the computation node of the plurality of computation nodes to process the data payload includes selecting the computation node based on a capability of the computation node to process the task type and instructing the computation node to process the data payload.

In Example 5, the computation offloading device of any one of Examples 2 to 4, wherein the robot is further configured to predict a location of the robot at the completion of a duration corresponding to the timing requirement; wherein the offload request further includes the predicted location of the robot; and wherein the computation offloading manager is configured to select the one or more second communication nodes based on the predicted location.

In Example 6, the computation offloading device of Example 5, wherein the computation offloading manager is configured to select two or more communication nodes based on the predicted location and to instruct the two or more second communication nodes to send the result of the processed data payload to the robot.

In Example 7, the computation offloading device of any one of Examples 2 to 6, wherein the computation offloading manager is configured to predict a location of the robot at the completion of a duration corresponding to the timing requirement; and wherein the computation offloading manager is configured to select the one or more second communication nodes based on the predicted location.

In Example 8, the computation offloading device of Example 7, wherein the computation offloading manager is configured to select two or more communication nodes based on the predicted location and to instruct the two or more second communication nodes to send the result of the processed data payload to the robot.

In Example 9 computation offloading device of Example 7 or 8, wherein the computation offloading manager includes an artificial neural network, configured to predict the location of the robot at the completion of the duration corresponding to the timing requirement; wherein the computation offloading manager predicting the location of the robot includes predicting the location as an output of the artificial neural network.

In Example 10, the computation offloading device of any one of Examples 1 to 9, wherein the computation offloading manager is further configured to select the computation node of the plurality of computation nodes based on the predicted location.

In Example 11, the computation offloading device of Example 10, wherein the computation offloading manager is configured to select the computation node by selecting a closest computation node to the predicted location of the robot.

In Example 12, the computation offloading device of any one of Examples 1 to 11, wherein the computation offloading manager is configured to generate resource data relating locations of each of the plurality of computation nodes to an availability of a computation resource or the availability of a network resource at each respective computation node of the plurality of computation nodes.

In Example 13, the computation offloading device of Example 12, wherein the computation offloading manager is further configured to send the resource data to the robot and to receive from the robot a suggested communication node for pickup of a result of a processing of the data payload based on the resource data.

In Example 14, the computation offloading device of Example 12 or 13, wherein the computation offloading manager is configured to select the one or more second communication nodes based on the predicted location and the resource data.

In Example 15, the computation offloading device of any one of Examples 12 to 14, wherein the computation offloading manager is configured to select the computation node of the plurality of computation nodes based on the predicted location and the resource data.

In Example 16, the computation offloading device of any one of Examples 12 to 15, wherein the computation resource is an available processing capacity.

In Example 17, the computation offloading device of Example 12 or 16, wherein the network resource is an available bandwidth or an amount of network congestion.

In Example 18, the computation offloading device of any one of Examples 12 to 17, wherein the computation offloading manager is configured to generate the resource data as a map in which each of the plurality of computation nodes are depicted relative to their physical location and the availability of the computation resource or the availability of the network resource at each respective computation node of the plurality of computation nodes.

In Example 19, the computation offloading device of any one of Examples 12 to 18, wherein the computation resource includes an amount of available computation resources for task processing.

In Example 20, the computation offloading device of any one of Examples 12 to 18, wherein the computation resource includes an amount of used or reserved computation resources.

In Example 21, the computation offloading device of any one of Examples 12 to 20, wherein the computation resource includes any of processor speed, number of cores, or presence or absence of a processor accelerator.

In Example 22, the computation offloading device of any one of Examples 12 to 21, wherein the computation resource represents a prediction of a computational availability of each of the plurality of computation nodes at a future time.

In Example 23, the computation offloading device of Example 11, further including an artificial neural network, configured to generate the prediction of the computational availability of each of the plurality of computation nodes.

In Example 24, the computation offloading device of any one of Examples 2 to 23, wherein the timing requirement includes a maximum duration for completion of the task.

In Example 25, the computation offloading device of any one of Examples 2 to 23, wherein the timing requirement includes an absolute time at which the task must be completed or a result of the task must be returned to the robot.

In Example 26, the computation offloading device of any one of Examples 1 to 25, wherein the computation offloading manager is configured to select at least two communication nodes for sending the result of the task to the robot, and wherein the computation offloading manager is configured to control the at least two communication nodes to multicast a result of the processing of the data payload to the robot.

In Example 27, the computation offloading device of any one of Examples 1 to 26, wherein the computation offloading manager is further configured to instruct the selected computation node to reserve computation resources for completion of the task.

In Example 28, a computation offloading system including: a plurality of communication nodes, each configured to wirelessly send and receive data; a robot, configured to send an offload request and a data payload to a first communication node of the plurality of communication nodes; a plurality of computation nodes, configured to execute computational tasks; a computation offloading manager, configured to: instruct a computation node of the plurality of computation nodes to process the data payload; select one or more second communication nodes of the plurality of communication nodes, different from the first communication node, based on a predicted location of the robot; and instruct the one or more second communication nodes to send a result of the processed data payload to the robot at the predicted location.

In Example 29, the computation offloading system of Example 28, wherein the offload request includes a timing requirement for processing the data payload; and wherein instructing the computation node of the plurality of computation nodes to process the data payload includes selecting the computation node based on the timing requirement and instructing the computation node to process the data payload.

In Example 30, the computation offloading system of Example 28, wherein the offload request includes a timing requirement for processing the data payload; and wherein instructing the computation node of the plurality of computation nodes to process the data payload includes selecting the computation node based on the timing requirement and instructing the computation node to process the data payload during a duration corresponding to the timing requirement.

In Example 31, the computation offloading system of any one of Examples 28 to 30, wherein the offload request further includes a task type, representing a type of task to be performed on the data payload, and wherein instructing the computation node of the plurality of computation nodes to process the data payload includes selecting the computation node based on a capability of the computation node to process the task type and instructing the computation node to process the data payload.

In Example 32, the computation offloading system of any one of Examples 29 to 31, wherein the robot is further configured to predict a location of the robot at the completion of a duration corresponding to the timing requirement; wherein the offload request further includes the predicted location of the robot; and wherein the computation offloading manager is configured to select the one or more second communication nodes based on the predicted location.

In Example 33, the computation offloading system of Example 32, wherein the computation offloading manager is configured to select two or more communication nodes based on the predicted location and to instruct the two or more second communication nodes to send the result of the processed data payload to the robot.

In Example 34, the computation offloading system of any one of Examples 29 to 33, wherein the computation offloading manager is configured to predict a location of the robot at the completion of a duration corresponding to the timing requirement; and wherein the computation offloading manager is configured to select the one or more second communication nodes based on the predicted location.

In Example 35, the computation offloading system of Example 34, wherein the computation offloading manager is configured to select two or more communication nodes based on the predicted location and to instruct the two or more second communication nodes to send the result of the processed data payload to the robot.

In Example 36, the computation offloading system of Example 34 or 35, wherein the computation offloading manager includes an artificial neural network, configured to predict the location of the robot at the completion of the duration corresponding to the timing requirement; wherein the computation offloading manager predicting the location of the robot includes predicting the location as an output of the artificial neural network.

In Example 37, the computation offloading system of any one of Examples 28 to 36, wherein the computation offloading manager is further configured to select the computation node of the plurality of computation nodes based on the predicted location.

In Example 38, the computation offloading system of Example 37, wherein the computation offloading manager is configured to select the computation node by selecting a closest computation node to the predicted location of the robot.

In Example 39, the computation offloading system of any one of Examples 28 to 38, wherein the computation offloading manager is configured to generate resource data relating locations of each of the plurality of computation nodes to an availability of a computation resource or the availability of a network resource at each respective computation node of the plurality of computation nodes.

In Example 40, the computation offloading system of Example 39, wherein the computation offloading manager is further configured to send the resource data to the robot, and wherein the robot is configured to send the computation offloading system a suggested communication node for pickup of a result of a processing of the data payload based on the resource data.

In Example 41, the computation offloading system of Example 39 or 40, wherein the computation offloading manager is configured to select the one or more second communication nodes based on the predicted location and the resource data.

In Example 42, the computation offloading system of any one of Examples 39 to 41, wherein the computation offloading manager is configured to select the computation node of the plurality of computation nodes based on the predicted location and the resource data.

In Example 43, the computation offloading system of any one of Examples 39 to 42, wherein the computation resource is an available processing capacity.

In Example 44, the computation offloading system of Example 39 or 43, wherein the network resource is an available bandwidth or an amount of network congestion.

In Example 45, the computation offloading system of any one of Examples 39 to 44, wherein the computation offloading manager is configured to generate the resource data as a map in which each of the plurality of computation nodes are depicted relative to their physical location and the availability of the computation resource or the availability of the network resource at each respective computation node of the plurality of computation nodes.

In Example 46, the computation offloading system of any one of Examples 39 to 45, wherein the computation resource includes an amount of available computation resources for task processing.

In Example 47, the computation offloading system of any one of Examples 39 to 45, wherein the computation resource includes an amount of used or reserved computation resources.

In Example 48, the computation offloading system of any one of Examples 39 to 47, wherein the computation resource includes any of processor speed, number of cores, or presence or absence of a processor accelerator.

In Example 49, the computation offloading system of any one of Examples 39 to 48, wherein the computation resource represents a prediction of a computational availability of each of the plurality of computation nodes at a future time.

In Example 50, the computation offloading system of Example 38, further including an artificial neural network, configured to generate the prediction of the computational availability of each of the plurality of computation nodes.

In Example 51, the computation offloading system of any one of Examples 29 to 50, wherein the timing requirement includes a maximum duration for completion of the task.

In Example 52, the computation offloading system of any one of Examples 29 to 50, wherein the timing requirement includes an absolute time at which the task must be completed or a result of the task must be returned to the robot.

In Example 53, the computation offloading system of any one of Examples 28 to 52, wherein the computation offloading manager is configured to select at least two communication nodes for sending the result of the task to the robot, and wherein the computation offloading manager is configured to control the at least two communication nodes to multicast a result of the processing of the data payload to the robot.

In Example 54, the computation offloading system of any one of Examples 28 to 53, wherein the computation offloading manager is further configured to instruct the selected computation node to reserve computation resources for completion of the task.

In Example 55, the computation offloading system of any one of Examples 28 to 54, wherein the plurality of computation nodes includes any of a processing platform, network interface controller, central processing unit, or hardware accelerator.

In Example 56, a non-transitory computer readable medium, including instructions which, if executed, cause a processor to: instruct a computation node of a plurality of computation nodes to process a data payload received from a robot at a first communication node of a plurality of communication nodes; select one or more second communication nodes of the plurality of communication nodes, different from the first communication node, based on a predicted location of the robot; and instruct the one or more second communication nodes to send a result of the processed data payload to the robot at the predicted location.

In Example 57, the non-transitory computer readable medium of Example 56, wherein the offload request includes a timing requirement for processing the data payload; and wherein the processor instructing the computation node of the plurality of computation nodes to process the data payload includes the processor selecting the computation node based on the timing requirement and instructing the computation node to process the data payload.

In Example 58, the non-transitory computer readable medium of Example 56, wherein the offload request includes a timing requirement for processing the data payload; and wherein the processor instructing the computation node of the plurality of computation nodes to process the data payload includes the processor selecting the computation node based on the timing requirement and instructing the computation node to process the data payload during a duration corresponding to the timing requirement.

In Example 59, the non-transitory computer readable medium of any one of Examples 56 to 58, wherein the offload request further includes a task type, representing a type of task to be performed on the data payload, and wherein instructing the computation node of the plurality of computation nodes to process the data payload includes selecting the computation node based on a capability of the computation node to process the task type and instructing the computation node to process the data payload.

In Example 60, the non-transitory computer readable medium of any one of Examples 57 to 59, wherein the offload request further includes a predicted location of the robot; and wherein the instructions are further configured to cause the processor to select the one or more second communication nodes based on the predicted location.

In Example 61, the non-transitory computer readable medium of Example 60, wherein the computation offloading manager is configured to select two or more communication nodes based on the predicted location and to instruct the two or more second communication nodes to send the result of the processed data payload to the robot.

In Example 62, the non-transitory computer readable medium of any one of Examples 57 to 61, wherein the instructions are further configured to cause the processor to predict a location of the robot at a completion of a duration corresponding to the timing requirement; and to select the one or more second communication nodes based on the predicted location.

In Example 63, the non-transitory computer readable medium of Example 62, wherein the instructions are further configured to cause the processor to select two or more communication nodes based on the predicted location and to instruct the two or more second communication nodes to send the result of the processed data payload to the robot.

In Example 64, the non-transitory computer readable medium of Example 62 or 63, further including an artificial neural network, configured to predict the location of the robot at the completion of the duration corresponding to the timing requirement; wherein the instructions are further configured to cause processor to predict the location of the robot as an output of the artificial neural network.

In Example 65, the non-transitory computer readable medium of any one of Examples 56 to 64, wherein the instructions are further configured to cause the processor to select the computation node of the plurality of computation nodes based on the predicted location.

In Example 66, the non-transitory computer readable medium of Example 65, wherein the instructions are further configured to cause the processor to select the computation node by selecting a closest computation node to the predicted location of the robot.

In Example 67, the non-transitory computer readable medium of any one of Examples 56 to 66, wherein the instructions are further configured to cause the processor to generate resource data relating locations of each of the plurality of computation nodes to an availability of a computation resource or the availability of a network resource at each respective computation node of the plurality of computation nodes.

In Example 68, the non-transitory computer readable medium of Example 67, wherein the instructions are further configured to cause the processor send the resource data to the robot and to receive from the robot a suggested communication node for pickup of a result of a processing of the data payload based on the resource data.

In Example 69, the non-transitory computer readable medium of Example 67 or 68, wherein the instructions are further configured to cause the processor select the one or more second communication nodes based on the predicted location and the resource data.

In Example 70, the non-transitory computer readable medium of any one of Examples 67 to 69, wherein the instructions are further configured to cause the processor to select the computation node of the plurality of computation nodes based on the predicted location and the resource data.

In Example 71, the non-transitory computer readable medium of any one of Examples 67 to 70, wherein the computation resource is an available processing capacity.

In Example 72, the non-transitory computer readable medium of Example 67 or 71, wherein the network resource is an available bandwidth or an amount of network congestion.

In Example 73, the non-transitory computer readable medium of any one of Examples 67 to 72, wherein the instructions are further configured to cause the processor to generate the resource data as a map in which each of the plurality of computation nodes are depicted relative to their physical location and the availability of the computation resource or the availability of the network resource at each respective computation node of the plurality of computation nodes.

In Example 74, the non-transitory computer readable medium of any one of Examples 67 to 73, wherein the computation resource includes an amount of available computation resources for task processing.

In Example 75, the non-transitory computer readable medium of any one of Examples 67 to 73, wherein the computation resource includes an amount of used or reserved computation resources.

In Example 76, the non-transitory computer readable medium of any one of Examples 67 to 75, wherein the computation resource includes any of processor speed, number of cores, or presence or absence of a processor accelerator.

In Example 77, the non-transitory computer readable medium of any one of Examples 67 to 76, wherein the computation resource represents a prediction of a computational availability of each of the plurality of computation nodes at a future time.

In Example 78, the non-transitory computer readable medium of Example 66, further including an artificial neural network, configured to generate the prediction of the computational availability of each of the plurality of computation nodes.

In Example 79, the non-transitory computer readable medium of any one of Examples 57 to 78, wherein the timing requirement includes a maximum duration for completion of the task.

In Example 80, the non-transitory computer readable medium of any one of Examples 57 to 78, wherein the timing requirement includes an absolute time at which the task must be completed or a result of the task must be returned to the robot.

In Example 81, the non-transitory computer readable medium of any one of Examples 56 to 80, wherein the instructions are further configured to cause the processor to select at least two communication nodes for sending the result of the task to the robot, and to control the at least two communication nodes to multicast a result of the processing of the data payload to the robot.

In Example 82, the non-transitory computer readable medium of any one of Examples 56 to 81, wherein the instructions are further configured to cause the processor to instruct the selected computation node to reserve computation resources for completion of the task.

In Example 83, a method of task offloading, including: instructing a computation node of a plurality of computation nodes to process a data payload received from a robot at a first communication node of a plurality of communication nodes; selecting one or more second communication nodes of the plurality of communication nodes, different from the first communication node, based on a predicted location of the robot; and instructing the one or more second communication nodes to send a result of the processed data payload to the robot at the predicted location.

In Example 84, the method of task offloading of Example 83, wherein the offload request includes a timing requirement for processing the data payload; and wherein instructing the computation node of the plurality of computation nodes to process the data payload includes selecting the computation node based on the timing requirement and instructing the computation node to process the data payload.

In Example 85, the method of task offloading of Example 83, wherein the offload request includes a timing requirement for processing the data payload; and wherein instructing the computation node of the plurality of computation nodes to process the data payload includes selecting the computation node based on the timing requirement and instructing the computation node to process the data payload during a duration corresponding to the timing requirement.

In Example 86, the method of task offloading of any one of Examples 83 to 85, wherein the offload request further includes a task type, representing a type of task to be performed on the data payload, and wherein instructing the computation node of the plurality of computation nodes to process the data payload includes selecting the computation node based on a capability of the computation node to process the task type and instructing the computation node to process the data payload.

In Example 87, the method of task offloading of any one of Examples 84 to 86, wherein the offload request further includes a predicted location of the robot; and further including selecting the one or more second communication nodes based on the predicted location.

In Example 88, the method of task offloading of Example 87, wherein further including selecting two or more communication nodes based on the predicted location and instructing the two or more second communication nodes to send the result of the processed data payload to the robot.

In Example 89, the method of task offloading of any one of Examples 84 to 88, further including predicting a location of the robot at a completion of a duration corresponding to the timing requirement; and selecting the one or more second communication nodes based on the predicted location.

In Example 90, the method of task offloading of Example 89, wherein further including selecting two or more communication nodes based on the predicted location and instructing the two or more second communication nodes to send the result of the processed data payload to the robot.

In Example 91, the method of task offloading of Example 89 or 90, predicting the location of the robot at the completion of the duration corresponding to the timing requirement using an artificial neural network.

In Example 92, the method of task offloading of any one of Examples 83 to 91, further including selecting the computation node of the plurality of computation nodes based on the predicted location.

In Example 93, the method of task offloading of Example 92, further including selecting the computation node by selecting a closest computation node to the predicted location of the robot.

In Example 94, the method of task offloading of any one of Examples 83 to 93, further including generating resource data relating locations of each of the plurality of computation nodes to an availability of a computation resource or the availability of a network resource at each respective computation node of the plurality of computation nodes.

In Example 95, the method of task offloading of Example 94, further including sending the resource data to the robot and receiving from the robot a suggested communication node for pickup of a result of a processing of the data payload based on the resource data.

In Example 96, the method of task offloading of Example 94 or 95, further including selecting the one or more second communication nodes based on the predicted location and the resource data.

In Example 97, the method of task offloading of any one of Examples 94 to 96, further including selecting the computation node of the plurality of computation nodes based on the predicted location and the resource data.

In Example 98, the method of task offloading of any one of Examples 94 to 97, wherein the computation resource is an available processing capacity.

In Example 99, a robot is disclosed, wherein the robot comprises a processor, configured to: control a transceiver to send an offload request and a data payload to a first communication node of a plurality of communication nodes from a first location at a first time period; control an actuator to cause the robot to travel to a second location; and receive via the transceiver a result of the processed data payload from a second communication node of the plurality of communication nodes at the second location at a second time period.

In Example 100, the robot of Example 99, wherein the offload request includes a duration during which the data payload must be processed; and wherein the second time period is a time at an end of the duration.

In Example 101, the robot of Example 99 or 100, wherein the offload request further includes a task type, representing a type of task to be performed on the data payload.

In Example 102, the robot of any one of Examples 99 to 101, wherein the robot is further configured to predict a location of the robot at a completion of the duration; wherein the offload request further includes the predicted location of the robot; and wherein receiving the result of the processed data payload from the second location comprises receiving the result of the processed data payload from the predicted location.

In Example 103, the robot of Examples 102, wherein the predicted location is the second location.

In Example 104, the robot of any one of Examples 99 to 103, wherein the robot is further configured to receive resource data representing locations of the plurality of communication nodes and computational resource or a network resource of each communication node of the plurality of communication nodes; and wherein the robot is configured to select a communication node of the plurality of communication nodes for receipt of the processed data payload based on the resource data, and send an identifier of the selected communication node to the first communication node.

In Example 105, the robot of Example 104, wherein the selected communication node is the second communication node, and wherein receiving the result of the processed data payload comprises receiving the result from the selected communication node.

In Example 106, the robot of any one of Examples 99 to 106, wherein the resource data represent locations of the plurality of communication nodes and computational resource or a network resource of each communication node of the plurality of communication nodes at a time period prior to the first time period; wherein the robot is further configured to predict, using the resource data, future resource data representing locations of the plurality of communication nodes and computational resource or a network resource of each communication node of the plurality of communication nodes at the second time period, and wherein the robot is configured to select a communication node of the plurality of communication nodes for receipt of the processed data payload based on the future resource data, and send an identifier of the selected communication node to the first communication node.

In Example 107, the robot of any one of Examples 99 to 106, wherein the timing requirement includes a maximum duration for completion of the task.

In Example 108, the robot of any one of Examples 99 to 107, wherein the timing requirement includes an absolute time at which the task must be completed or a result of the task must be returned to the robot.

In Example 109, the robot of any one of Examples 99 to 108, further comprising the transceiver.

In Example 110, the robot of any one of Examples 99 to 109, further comprising the actuator.

In Example 111, the robot of any one of Examples 99 to 110, further comprising an interface to the transceiver, configured to carry electric signals from the processor to the transceiver, and from the transceiver to the processor. While the above descriptions and connected figures may depict components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all Examples included herein.

What is claimed is:

1. A computation offloading device comprising:
a plurality of communication nodes, each configured to wirelessly send and receive data;
a processor, configured to:
instruct a computation node of a plurality of computation nodes to process a data payload received from a robot at a first communication node of the plurality of communication nodes, wherein instructing the computation node of the plurality of computation nodes to process the data payload comprises selecting the computation node based on a capability of the computation node to process a task type, wherein the task type represents a type of task to be performed on the data payload;
select one or more second communication nodes of the plurality of communication nodes, different from the first communication node, based on a predicted location of the robot; and
instruct the one or more second communication nodes to send a result of the processed data payload to the robot at the predicted location.

2. The computation offloading device of claim 1, wherein the processor instructing the computation node of the plurality of computation nodes to process the data payload comprises the processor selecting the computation node based on a timing requirement for processing the data payload.

3. The computation offloading device of claim 2, wherein the processor is configured to predict a location of the robot at a completion of a duration corresponding to the timing requirement; and wherein the computation offloading device is configured to select the one or more second communication nodes based on the predicted location.

4. The computation offloading device of claim 3, wherein the computation offloading device is configured to select two or more second communication nodes based on the predicted location and to instruct the two or more second communication nodes to send the result of the processed data payload to the robot.

5. The computation offloading device of claim 3, wherein the computation offloading device is further configured to select the computation node of the plurality of computation nodes based on the predicted location.

6. The computation offloading device of claim 5, wherein the computation offloading device is configured to select the computation node by selecting a closest computation node to the predicted location of the robot.

7. The computation offloading device of claim 1, wherein the computation offloading device is configured to generate resource data relating locations of each of the plurality of computation nodes to an availability of a computation resource or the availability of a network resource at each respective computation node of the plurality of computation nodes.

8. The computation offloading device of claim 7, wherein the computation offloading device is further configured to send the resource data to the robot and to receive from the robot a suggested communication node for pickup of a result of a processing of the data payload based on the resource data.

9. The computation offloading device of claim 8, wherein the computation offloading device is configured to select the one or more second communication nodes based on the predicted location and the resource data.

10. The computation offloading device of claim 7, wherein the computation resource is an available processing capacity.

11. The computation offloading device of claim 7, wherein the network resource is an available bandwidth or an amount of network congestion.

12. The computation offloading device of claim 7, wherein the computation offloading device is configured to generate the resource data as a map in which each of the plurality of computation nodes are depicted relative to their physical location and the availability of the computation resource or the availability of the network resource at each respective computation node of the plurality of computation nodes.

13. The computation offloading device of claim 7, wherein the computation resource represents a prediction of a computational availability of each of the plurality of computation nodes at a future time.

14. The computation offloading device of claim 2, wherein the timing requirement comprises a maximum duration for completion of the task, an absolute time at which the task must be completed, or a result of the task must be returned to the robot.

15. The computation offloading device of claim 1, wherein the computation offloading device is further configured to instruct the selected computation node to reserve computation resources for completion of the task.

16. The computation offloading device of claim 1, wherein the computation offloading device is configured to select at least two communication nodes as the one or more second communication nodes for sending the result of the processed data payload to the robot, and wherein the computation offloading device is configured to control the at least two communication nodes to multicast the result of the processed data payload to the robot.

17. A robot comprising:
a processor, configured to:
control a transceiver to send an offload request and a data payload to a first communication node of a plurality of communication nodes from a first location at a first time period, wherein the offload request comprises a task type, representing a type of task to be performed on the data payload;
control an actuator to cause the robot to travel to a second location; and
receive via the transceiver a result of the processed data payload from a second communication node of the plurality of communication nodes at the second location at a second time period.

18. The robot of claim 17, wherein the robot is further configured to predict a location of the robot at a completion of the duration; wherein the offload request further includes the predicted location of the robot; and wherein receiving the result of the processed data payload from the second location comprises receiving the result of the processed data payload at the predicted location.

19. A non-transitory computer readable medium, comprising instructions which, if executed, cause a processor to:
instruct a computation node of a plurality of computation nodes to process a data payload received from a robot at a first communication node of a plurality of communication nodes, wherein instructing the computation node of the plurality of computation nodes to process the data payload comprises selecting the computation node based on a capability of the computation node to process a task type, wherein the task type represents a type of task to be performed on the data payload;
select one or more second communication nodes of the plurality of communication nodes, different from the first communication node, based on a predicted location of the robot; and
instruct the one or more second communication nodes to send a result of the processed data payload to the robot at the predicted location.

20. The non-transitory computer readable medium of claim 19, wherein the processor instructing the computation node of the plurality of computation nodes to process the data payload comprises the processor selecting the computation node based on a timing requirement for processing the data payload.

* * * * *